(12) United States Patent
Toresson

(10) Patent No.: US 11,070,833 B2
(45) Date of Patent: Jul. 20, 2021

(54) METHOD AND SYSTEM FOR ENCODING VIDEO WITH OVERLAY

(71) Applicant: Axis AB, Lund (SE)

(72) Inventor: Alexander Toresson, Lund (SE)

(73) Assignee: Axis AB, Lund (SE)

( * ) Notice: Subject to any disclaimer, the term of this patent is extended or adjusted under 35 U.S.C. 154(b) by 73 days.

(21) Appl. No.: 16/452,431

(22) Filed: Jun. 25, 2019

(65) Prior Publication Data

US 2020/0007883 A1 Jan. 2, 2020

(30) Foreign Application Priority Data

Jul. 2, 2018 (EP) ..................................... 18181175

(51) Int. Cl.
*H04N 19/46* (2014.01)
*H04N 19/107* (2014.01)
*H04N 19/16* (2014.01)
*H04N 5/272* (2006.01)

(52) U.S. Cl.
CPC ............. *H04N 19/46* (2014.11); *H04N 5/272* (2013.01); *H04N 19/107* (2014.11); *H04N 19/16* (2014.11)

(58) Field of Classification Search
CPC ...... H04N 19/46; H04N 19/107; H04N 19/16; H04N 5/272; H04N 19/27; H04N 19/105; H04N 19/167; H04N 19/176; H04N 19/177; H04N 19/42; H04N 19/44; H04N 5/265

See application file for complete search history.

(56) References Cited

U.S. PATENT DOCUMENTS

| 2006/0088286 A1* | 4/2006 | Shibata ................. G11B 27/005 386/344 |
| 2017/0163994 A1* | 6/2017 | Sanchez De La Fuente ............... H04N 21/816 |
| 2018/0278964 A1* | 9/2018 | Wang ............... H04N 21/85406 |

FOREIGN PATENT DOCUMENTS

| WO | 2016/180486 A1 | 11/2016 |
| WO | WO-2016180486 A1 * | 11/2016 ......... H04N 21/2365 |

OTHER PUBLICATIONS

Skupin, Robert, Yago Sanchez, and Thomas Schierl. "Compressed domain video compositing with HEVC." 2015 Picture Coding Symposium (PCS). IEEE, 2015 (Year: 2015).*
Extended European Search Report dated Aug. 21, 2018 for the European Patent Application No. 18181175.3.

* cited by examiner

*Primary Examiner* — Tat C Chio
(74) *Attorney, Agent, or Firm* — Volpe Koenig

(57) ABSTRACT

Encoding video data comprises receiving an image sequence comprising first and second input image frames, adding an overlay, thereby generating first and second generated image frames, and encoding a video stream containing output image frames with and without overlay. The first input image frame is encoded as an intra-frame to form a first output image frame. The second input image frame is encoded as an inter-frame with reference to the first output image frame to form a second output image frame. The generated image frames are encoded as inter-frames with reference to the first and second output image frames to form first and second overlaid output image frames. A first part of the second generated image frame is encoded with reference to the first overlaid output image frame, and a second part of the second generated image frame is encoded with reference to the second output image frame.

15 Claims, 8 Drawing Sheets

METHOD AND SYSTEM FOR ENCODING VIDEO WITH OVERLAY

TECHNICAL FIELD

The present invention relates to the field of video encoding, and more particularly to encoding video having one or more overlays.

BACKGROUND

When displaying video, it is in many cases desirable to apply an overlay on the video. For instance, in surveillance scenarios, it is useful to have a time stamp showing when the video was captured. If video from a number of different cameras can be viewed in one location, such as a control centre, the operator may have an easier time locating where a particular video sequence was captured if a label is displayed, e.g., indicating "Camera 5" or "Loading dock". If video analytics is run on the video, indicators of events may be applied in the form of overlays. As an example, if an object detection algorithm detects a person, a bounding box around that person may be applied as an overlay on the video. Overlays in the form of logotypes are widely used in broadcasting and may be used also in other applications, such as surveillance. Such logotypes are often static, but may be dynamic, e.g., for indicating that the video stream is still live, even if the captured scene is static. Similarly, subtitles may be applied as an overlay. Another application of overlays is picture-in-picture, where one video stream is displayed in front of another.

Overlays may be applied to video in different ways. One common approach is to replace the pixel data of the captured video with pixel data of the overlay in the pixel locations where the overlay is to be applied. This means that the original pixel data in those locations are lost.

In broadcasting, the application of an overlay is usually not problematic, as the original video sequence, such as a film or a TV show, is usually captured in a way that the area later covered by, e.g., a TV station logotype is not important. The video sequence is also generally available from the production company without overlay. In other applications, such as surveillance, the events in the scene are seldom scripted, and interesting details or objects may appear in areas that will be covered by an overlay. At times, this will be merely annoying to the operator, but for forensic use, it may be critical.

One solution to this problem is to transmit and store video sequences both with and without overlay. However, transmission bandwidth may make this infeasible if a sufficient image quality is to be maintained. Further, the storage of two versions of the same video sequence increases the requirements on storage capacity, which is often responsible for a large part of the costs of a surveillance or monitoring system.

Hence, there is a need for improved methods and systems for encoding video with overlays.

SUMMARY OF THE INVENTION

A method of encoding video makes it possible to access video data that is covered by an overlay.

A method of encoding video with overlay, makes it possible to limit bandwidth and storage requirements, while maintaining an acceptable image quality.

A system for encoding video with overlays, improves forensic usability of the encoded video.

An encoding system enables provision of useful video without unduly increasing the need for transmission bandwidth or storage capacity.

According to a first aspect, by a method of encoding video data, comprises: receiving an image sequence comprising a first input image frame and a second input image frame, receiving an overlay to be applied to the image sequence, the overlay comprising a picture element and spatial coordinates for positioning the picture element in the first and second input image frames, adding the picture element to the first and second input image frames in accordance with the spatial coordinates, thereby generating an overlaid image sequence comprising a first generated image frame and a second generated image frame, encoding a video stream containing output image frames without overlay and corresponding output image frames with overlay, wherein: the first input image frame is encoded as an intra-frame to form a first output image frame, the second input image frame is encoded as an inter-frame with reference to the first output image frame to form a second output image frame, the first generated image frame is encoded as an inter-frame with reference to the first output image frame to form a first overlaid output image frame, the second generated image frame is encoded as an inter-frame to form a second overlaid output image frame, wherein a first part of the second generated image frame is encoded with reference to the first overlaid output image frame, and a second part of the second generated image frame is encoded with reference to the second output image frame. Such a method makes it possible to transmit video with and without overlays in an efficient manner. By choosing wisely which frame, with or without overlay, to use as reference frame, a bitrate increase that would occur if the video were simply encoded separately with and without overlay, may be curbed.

The first output image frame and the first overlaid output image frame may both be encoded with a first picture order count, and the second output image frame and the second overlaid output image frame may both be encoded with a second picture order count. In this manner, a decoder may be informed that the output image frames and the overlaid output image frames are versions of the same frame.

In some variants of the method, the first output image frame and the second output image frame are each encoded with a non-display indicator. In this manner, only the image frames with overlay will be displayed, even though the encoded sequence also contains image frames without overlay. Depending on the video compression standard used, the non-display indicator may take different forms, such as a "no display SEI message" or a "non-display flag".

The first part of the second generated frame may contain at least a portion of the picture element. Thus, if a macroblock or pixel group of the second generated frame is located where the overlay is applied, that macroblock or pixel group may be encoded with reference to the first overlaid output image frame. This takes advantage of temporal redundancy between the first and second generated frames, particularly if the overlay is static. The first part may be a macroblock or corresponding coding unit, or a number of such macroblocks or coding units.

The second part of the second generated frame may be outside the spatial coordinates of the overlay. Thus, if a macroblock or pixel group of the second generated frame is located where the overlay is not applied, that macroblock or pixel group may be encoded with reference to the second output image frame. Hereby, encoding may be efficient, since use is made of the encoded second output image, which except for the overlay is generally identical to the second overlaid output image frame, such that encoding efforts do not have to be duplicated. In the same way as discussed for the first part, the second part may be a macroblock or corresponding coding unit, or a number of such macroblocks or coding units.

In some variants, the method further comprises: receiving an additional overlay to be applied to the image sequence, the additional overlay comprising an additional picture element and additional spatial coordinates for positioning the additional picture element in the first and second input image frames, adding the additional picture element to the first and second input image frames in accordance with the additional spatial coordinates, thereby generating an additional overlaid image sequence comprising a first additional generated image frame and a second additional generated image frame, wherein encoding a video stream containing output image frames without overlay and corresponding output image frames with overlay additionally comprises encoding corresponding output image frames with additional overlay, wherein: the first additional generated image frame is encoded as an inter-frame with reference to the first output image frame to form a first additional overlaid output image frame, the second additional generated image frame is encoded as an inter-frame to form a second additional overlaid output image frame, wherein a first part of the second additional generated image frame is encoded with reference to the first additional overlaid output image frame, and a second part of the second additional generated image frame is encoded with reference to the second output image frame. It may be seen that the same principle may be used for encoding any number of different overlays applied on a video sequence.

The first part of the second additional generated frame may contain at least a portion of the additional picture element. In the same way as when encoding video with just one overlay, this enables efficient encoding of an additional overlay.

Similarly, the second part of the second additional generated frame may be outside the additional spatial coordinates of the additional overlay. As in the case of one overlay, this makes it possible to limit the encoding effort.

According to a second aspect, the abovementioned objects are achieved, in full or at least in part, by a video encoding system comprising: an image receiver arranged to receive an image sequence comprising a first input image frame and a second input image frame, an overlay receiver arranged to receive an overlay to be applied to the image sequence, the overlay comprising a picture element and spatial coordinates for positioning the picture element in the first and second input image frames, an overlay applicator arranged to add the picture element to the first and second input image frames in accordance with the spatial coordinates, thereby generating an overlaid image sequence comprising a first generated image frame and a second generated image frame, an encoder arranged to encode a video stream containing output image frames without overlay and corresponding output image frames with overlay, wherein: the first input image frame is encoded as an intra-frame to form a first output image frame, the second input image frame is encoded as an inter-frame with reference to the first output image frame to form a second output image frame, the first generated image frame is encoded as an inter-frame with reference to the first output image frame to form a first overlaid output image frame, the second generated image frame is encoded as an inter-frame to form a second overlaid output image frame, wherein a first part of the second generated image frame is encoded with reference to the first overlaid output image frame, and a second part of the second generated image frame is encoded with reference to the second output image frame. Such a system makes it possible to encode a sequence of images with and without overlay, such that video data that would be lost if covered by the overlay is still accessible. The system also makes it possible to avoid an undue increase in bandwidth and storage requirements, while maintaining useful image quality.

In some embodiments of the video encoding system, the encoder is arranged to encode each of the first output image frame and the second output image frame with a non-display indicator. Thus, even if the encoded video sequence contains image frames with as well as without overlay, only the image frames with overlay will be displayed. The image frames without overlay may still be stored for later use. As noted above, the non-display indicator may be implemented in various ways depending on the video compression standard used.

In some embodiments, the overlay receiver is additionally arranged to receive an additional overlay to be applied to the image sequence, the additional overlay comprising an additional picture element and additional spatial coordinates for positioning the additional picture element in the first and second input image frames, the overlay applicator is additionally arranged to add the additional picture element to the first and second input image frames in accordance with the additional spatial coordinates, thereby generating an additional overlaid image sequence comprising a first additional generated image frame and a second additional generated image frame, and the encoder is arranged to encode the video stream additionally containing corresponding output image frames with additional overlay, wherein: the first additional generated image frame is encoded as an inter-frame with reference to the first output image frame to form a first additional overlaid output image frame, the second additional generated image frame is encoded as an inter-frame to form a second additional overlaid output image frame, wherein a first part of the second additional generated image frame is encoded with reference to the first additional overlaid output image frame, and a second part of the second additional generated image frame is encoded with reference to the second output image frame. Such a system enables efficient encoding of a video sequence with and without overlay, also when it is desired to apply one or more additional overlays.

According to a third aspect, a video transmission system comprises an encoding system according to the first aspect, and a decoding system, the decoding system comprising: a video receiver arranged to receive the encoded video stream from the encoding system, and a decoder arranged to decode the encoded video stream. Such a video transmission system provides the possibility of transmitting video data with and without overlay in an efficient way, allowing access to the video data that would be hidden by the overlay.

The decoder may be arranged to decode the first and second output images with a non-display indicator, similar to what has been mentioned above for the encoder.

The video transmission system may further comprise a transcoder, the transcoder comprising the decoder, wherein the transcoder is arranged to decode the first and second output image frames to form a first decoded video stream containing decoded image frames without overlay, and decode the first and second overlaid output image frames to form a second decoded video stream containing decoded image frames with overlay. This makes it possible to handle the video sequences with and without overlay separately. For instance, the first decoded video stream without overlays may be stored for possible later forensic use, and the second decoded video stream with overlay may be transmitted to, e.g., a control centre, where it may be displayed to an operator. In some scenarios, the first decoded video stream may be transmitted to a user who needs to see the video stream without overlay, and the second decoded video stream may be transmitted to a user who should see the video stream with overlay.

According to a fourth aspect, a camera comprises an encoding system according to the second aspect.

A further scope of applicability will become apparent from the detailed description given below. However, it should be understood that the detailed description and specific examples, while indicating embodiments, are given by way of illustration only, since various changes and modifications will become apparent to those skilled in the art from this detailed description.

Hence, it is to be understood that the teachings herein are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The teachings will now be set forth in more detail by way of example and with reference to the accompanying schematic drawings, in which.

DETAILED DESCRIPTION OF EMBODIMENTS

Figure 1:
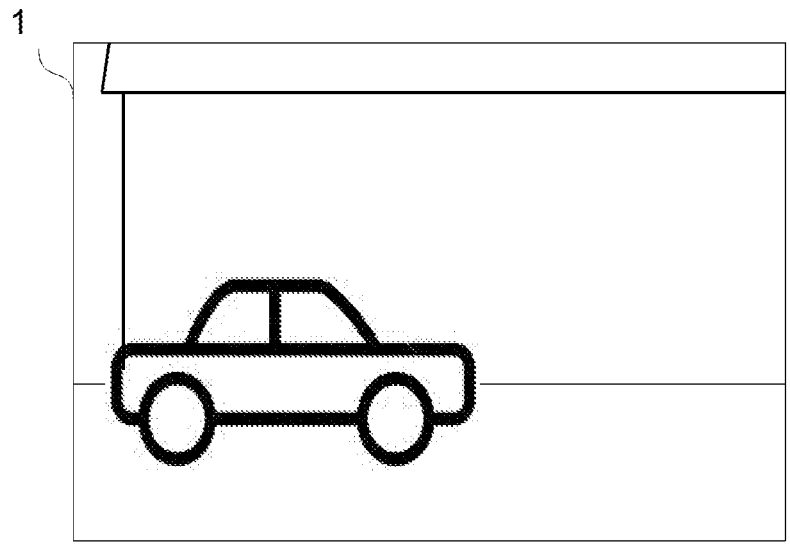
FIG. 1 is an illustration of an image of a scene.
Figure 2:
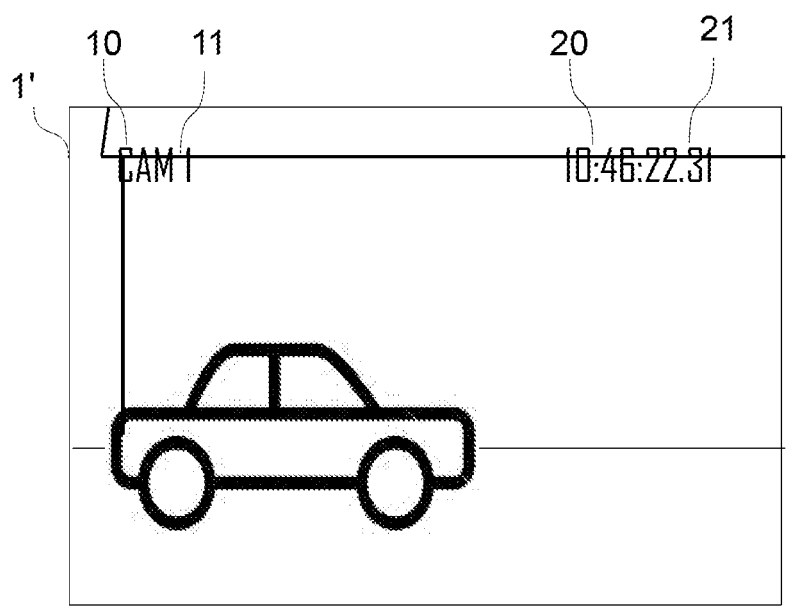
FIG. 2 is an illustration of the image of FIG. 1 with an overlay applied.

In FIG. 1, an image 1 is shown, and in FIG. 2, a corresponding image 1' is shown, to which an overlay 10 has been applied. As will be discussed further below, the overlay 10 comprises a picture element 11 and spatial coordinates specifying where in the image 1' the picture element 11 should be applied. The picture element 11 may be received in a number of different formats, such as a text string, in a vector based format, or as a bitmap. In the example shown, the overlay 10 is static, and the picture element 11 is a text, "Cam 1", identifying the camera capturing the image to an operator. Further, in this example, there is also an additional overlay 20, which comprises an additional picture element 21 and additional spatial coordinates specifying where in the image 1' to apply the additional picture element 21. The additional overlay 20 is dynamic, and the additional picture element 21 displays the time at which the image 1' was captured. It should be noted that the number of overlays shown is in no way limiting, and that one or more overlays may be used. It should also be noted that in the case of two or more overlays, they may be any combination of static or dynamic overlays.

In the following, encoding of a video sequence with at least one overlay will be described. In this context, the image 1 without overlay will be referred to as a first input image frame 1, and the corresponding image 1' with overlay will be referred to as a first generated image frame 1', because the image 1' with overlay is generated by adding the overlay to the first input image frame 1.

Figure 3:
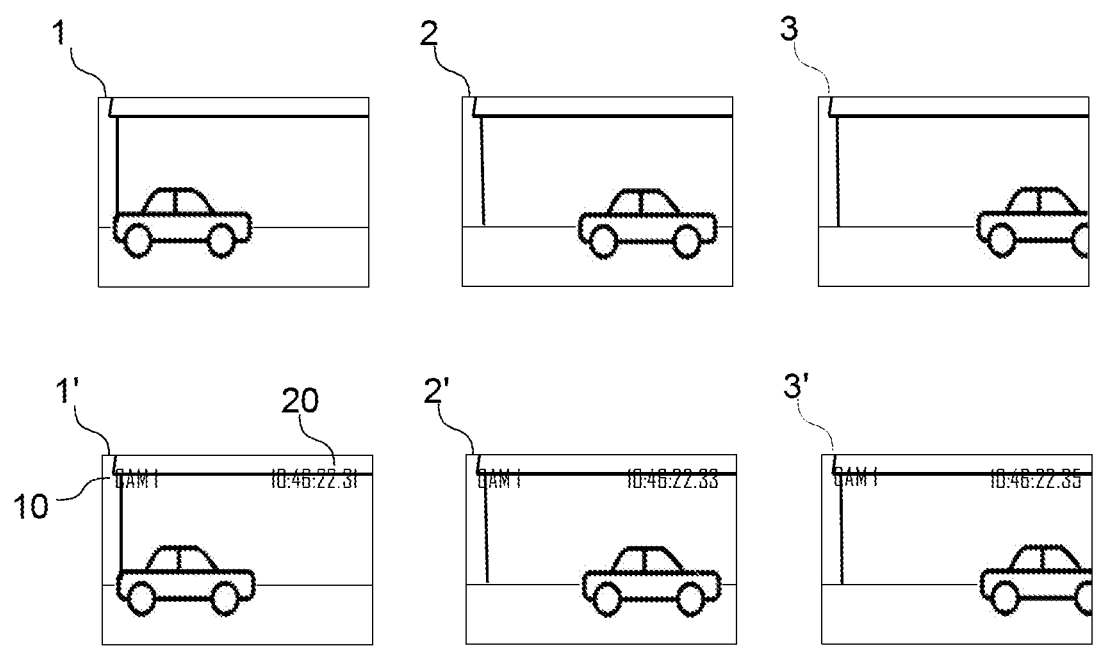
FIG. 3 is a schematic representation of a sequence of input image frames, and a corresponding overlaid image sequence.
Figure 6:
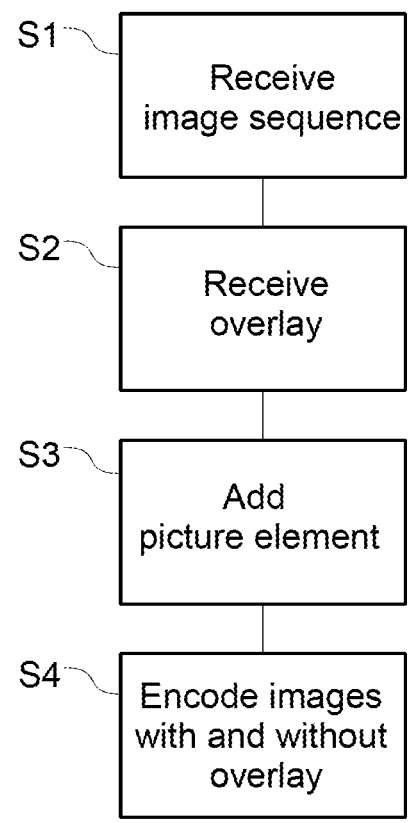
FIG. 6 is a flow chart of a method of encoding video according to a variant.

FIG. 3 illustrates a sequence of images including a first input image frame 1, a second input image frame 2, and a third input image frame 3. With reference to FIG. 6, this image sequence is received in step S1. A corresponding sequence of images with overlays is also shown, including a first generated image frame 1', a second generated image frame 2', and a third generated image frame 3'. The overlay 10 and the additional overlay 20 are received in step S2.

The generated image frames 1', 2', 3' are generated by adding the picture element 11 and the additional picture element 20 to the input image frames 1, 2, 3 in the locations dictated by the spatial coordinates and the additional spatial coordinates. In FIG. 6, this is indicated as step S3. The static overlay 10 is the same in each generated image 1'-3', whereas the dynamic overlay 20 changes from one generated image to the next in accordance with the passage of time during image capture.

Figure 7:
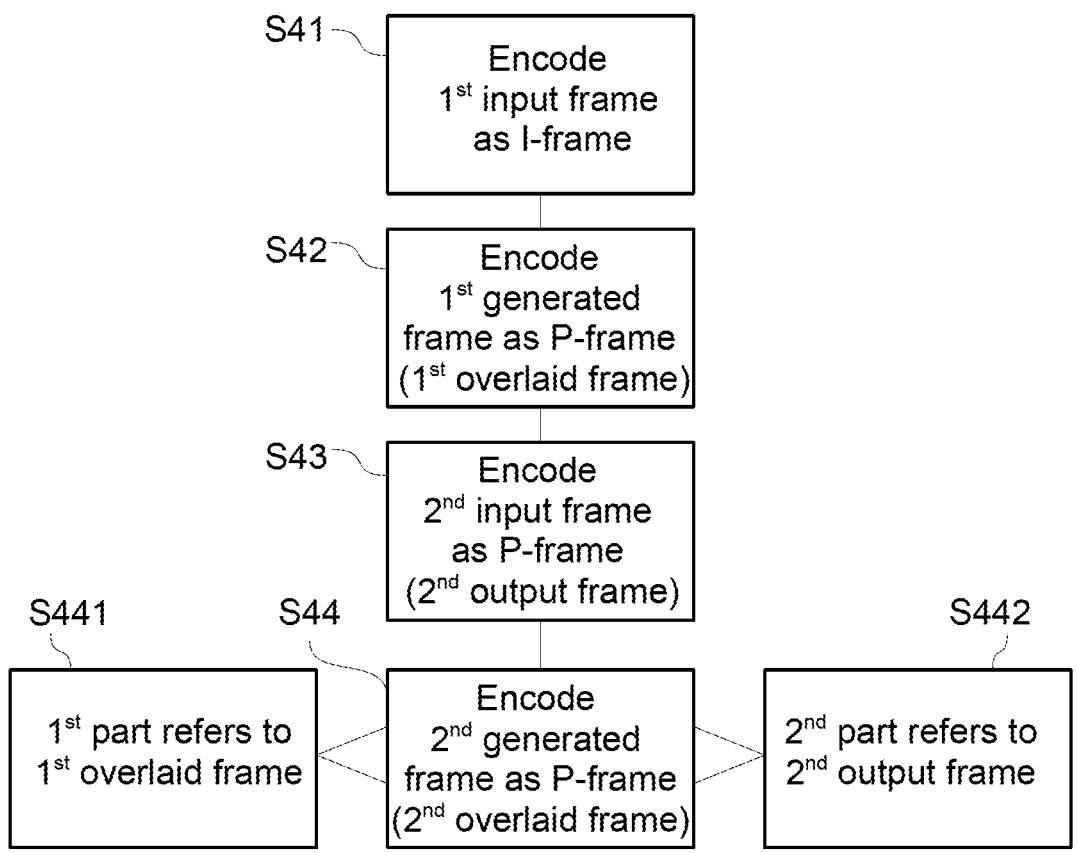
FIG. 7 is a flow chart of part of the method in FIG. 6.

In order to be able to transmit and store the video sequence with and without overlay, it is encoded in order to reduce the number of bits required for representing the image frames. Encoding may be done according to various video compression standards, e.g., according to the H.264 or the H.265 standard. According to one aspect, the encoding is modified to enable particularly efficient encoding of the video sequence with overlay allowing access also to the video sequence without overlay. In FIG. 6 the encoding is indicated as step S4. For a more detailed illustration of the encoding, reference is made to FIG. 7.

Figure 4:
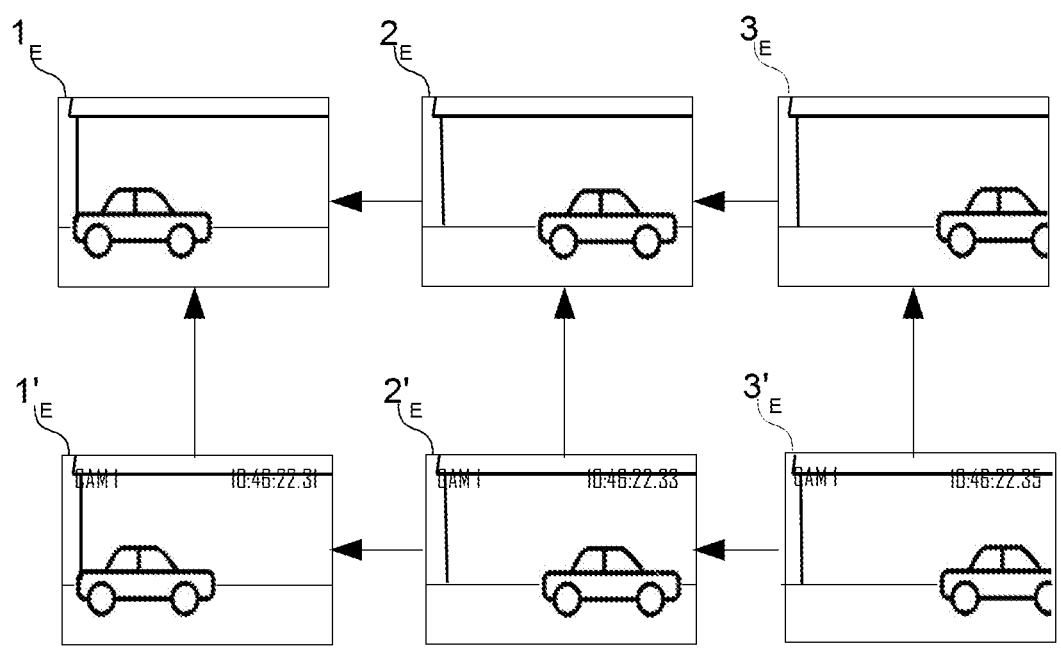
FIG. 4 is a schematic representation of an encoded image stream containing output image frames with and without overlay corresponding to the image frames in FIG. 3, FIGS. 5a-5d are illustrations of examples of partitioning of the overlaid image of FIG. 2.

The arrows between image frames in FIG. 4 indicate what reference frame is used for encoding a particular image frame 1-3 or generated image frame 1'-3'.

An example of encoding will now be described with reference to FIGS. 3-7. FIG. 4 is similar to FIG. 3, but shows the encoded image frames. When encoding the input image frames 1-3 and the generated image frames 1'-3', the first input image frame 1 is encoded as an intra-frame, i.e. without reference to any other image frame (S41). This encoded frame will be referred to as a first output image frame $1_E$. This is done in the same way as usually done according to the video compression standard used. The first generated image frame 1' is encoded as an inter-frame with a decoded version of the first output image frame as reference frame (S42), forming a first overlaid output frame $1'_E$. Except for the overlay 10 and the additional overlay 20, the first generated image frame 1 is identical to the first input image frame. For those parts of the first generated image frame 1' that do not contain any of the overlays, inter-frame encoding may therefore advantageously be done using skip blocks, which means that the data of the encoded macroblocks is copied from the reference frame. It is possible to encode also parts of the first generated image 1' that do not contain overlay using inter-coding, i.e. as P-blocks, but as the first input image frame does not contain the overlays, it will in most cases be more efficient to encode macroblocks in the areas of the overlay and the additional overlay by intra-coding, i.e. as I-blocks. The inter-frame encoding of the first generated image frame is done in the same way as usual.

The second input image frame 2 is encoded as an inter-frame with reference to a decoded version of the first output image frame 1 (S43), forming a second output image frame $2_E$. This is also done as usual for the compression standard.

Figure 5A:
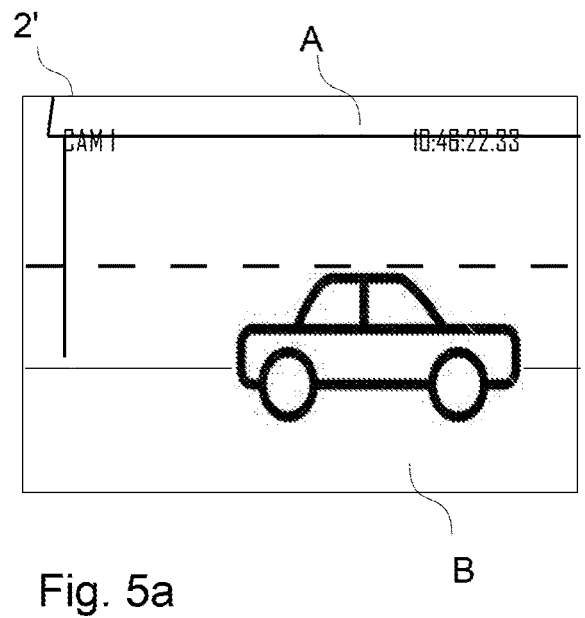
Figure 5B:
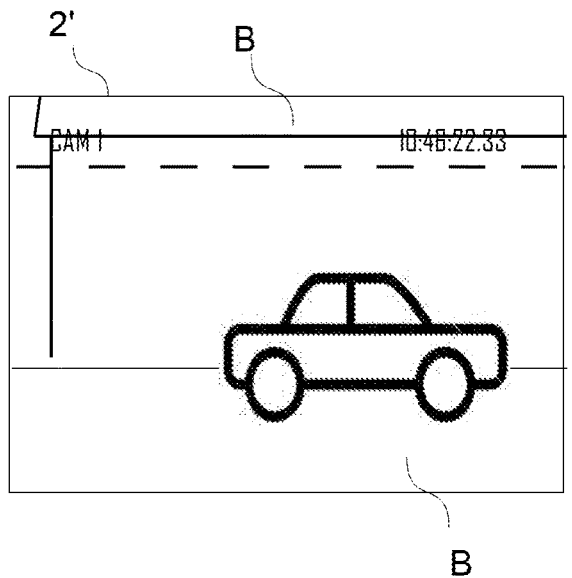
Figure 5C:
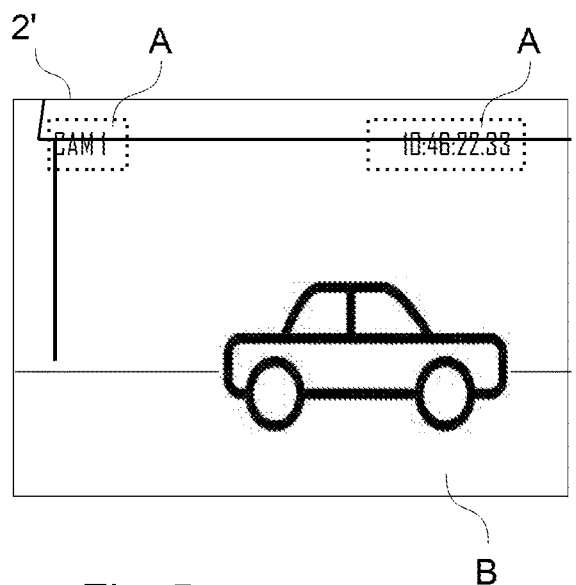
Figure 5D:
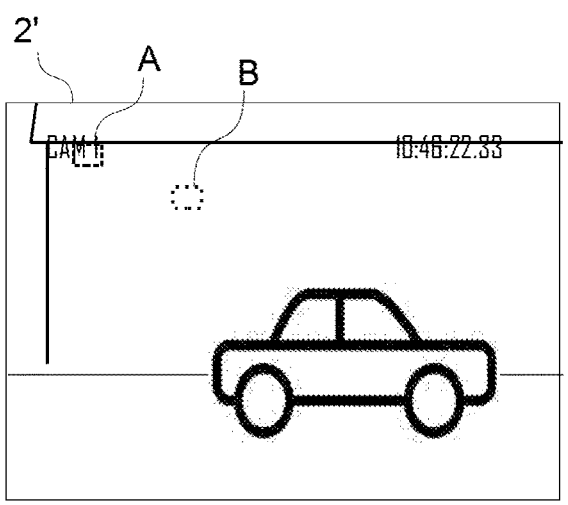

The second generated image frame 2' is encoded as an inter-frame (S44), forming a second overlaid output frame $2'_E$. Different from the first and second input image frames 1, 2, and the first generated image frame 1', the second generated image frame 2' is encoded using two reference frames. The choice of reference frame is different for different parts of the second generated image frame 2'. Turning to FIG. 5, the second generated input frame 2' is divided into two parts, a first part A in which the overlays are located, and a second part B, in which there are no overlays. The division may be made in various ways. In FIG. 5a, the second generated image frame 2' is simply halved in two. In FIG. 5b, the first part A is a strip at the top of the image frame. In FIG. 5c, the first part A is made up of two areas, one around each overlay, and in FIG. 5d, the first part A is a macroblock containing part of the overlay 10, and the second part B is a macroblock not containing any overlay.

In the following, it is assumed that the first part A is a macroblock in the area of the overlay 10, and that the second part B is a macroblock in an area of the image where there is no overlay, i.e. outside the spatial coordinates and the additional spatial coordinates. When encoding the first part A, the first overlaid output frame $1'_E$ is used as reference frame, as indicated in step S441. Since the first part A contains at least part of the overlay 10, it is likely that it is more similar to a corresponding part of the first overlaid output frame $1'_E$ than the second output image frame $2_E$, particularly if the overlay 10 is static. If there is a lot of movement in the scene, such that the first input image frame 1 differs a lot from the second input image frame 2, it could be more efficient to use the second output image frame $2_E$ as reference frame, particularly if only a small part of the first part A is covered by the overlay 10. This may also be the case if the overlay is dynamic, such as the additional overlay 20, as there may be many pixels that change from one frame to another. Thus, a choice may be made if the first part A is only partially covered by the overlay 10, such that the reference frame that is most likely to yield the smallest bitrate is chosen, be that the first overlaid output frame $1'_E$ or the second output image frame $2_E$.

When encoding the second part B of the second overlaid image frame 2', the second output image frame $2_E$ is used as reference, as indicated in step S442. Since the second part is outside the overlays 10, 20, it should be essentially identical to the corresponding part of the second output image frame $2_E$.

Encoding then continues in the same way for the third input image frame 3 and the third generated image frame 3'. Thus, the third output image frame is encoded as an inter-frame, using the second output image frame $2_E$ is used as reference frame. The third generated image frame 3' is also encoded as an interframe, but with different reference frames for different parts of the image frame. The second overlaid output image frame $2'_E$ is used as reference when encoding those macroblocks of the third generated image frame that contain part of the overlay 10 or the additional overlay 20, and the third output image frame $3_E$ is used as reference frame when encoding macroblocks located outside the overlay 10 and the additional overlay.

Encoding continues like this until the end of a group of pictures, in short a GOP, is reached. The length of the group of pictures is also referred to as a GOP length, and this may be fixed, set by the user, or dynamically controlled. When a new GOP is started, encoding once more starts with an intra-frame, as indicated in step S41, continuing with inter-frames as in steps S42, S43, S44, S441, and S442 until the end of that GOP has been reached.

With a method as described above, it is possible to encode image frames with and without overlay in the same stream. The use of two different reference frames for encoding the images with overlay limits the number of bits needed for encoding each image frame in two versions. In the example shown, there are two overlays, but the method is equally applicable if only one or more than two overlays are used.

When the encoded video sequence is to be displayed, e.g., in real-time in a control centre, or played back from a recording, different measures may be taken for displaying the desired images. For instance, the H.265 standard has support for non-display flags. This means that when an image frame is encoded, it can be marked with a non-display flag, and when a compatible decoder decodes the image frame, it reads the non-display flag and the image frame is therefore not displayed. If it is implemented in an H.265 codec, this feature may be used for making sure that only the overlaid output image frames are displayed after decoding. Thus, each output image frame $1_E$-$3_E$ is encoded with a non-display flag. Hereby, although the encoded and decoded video sequence contains the images with and without overlay, only those with overlay will be displayed.

There are also video compression standards, such as H.264, that do not support non-display flags. In such case, if the output image frames $1_E$-$3_E$ are encoded with non-display flags, a standard H.264 decoder will not handle these as intended. Thus, a modified decoder will need to be used, which is programmed to handle the non-display flags.

Figure 8:
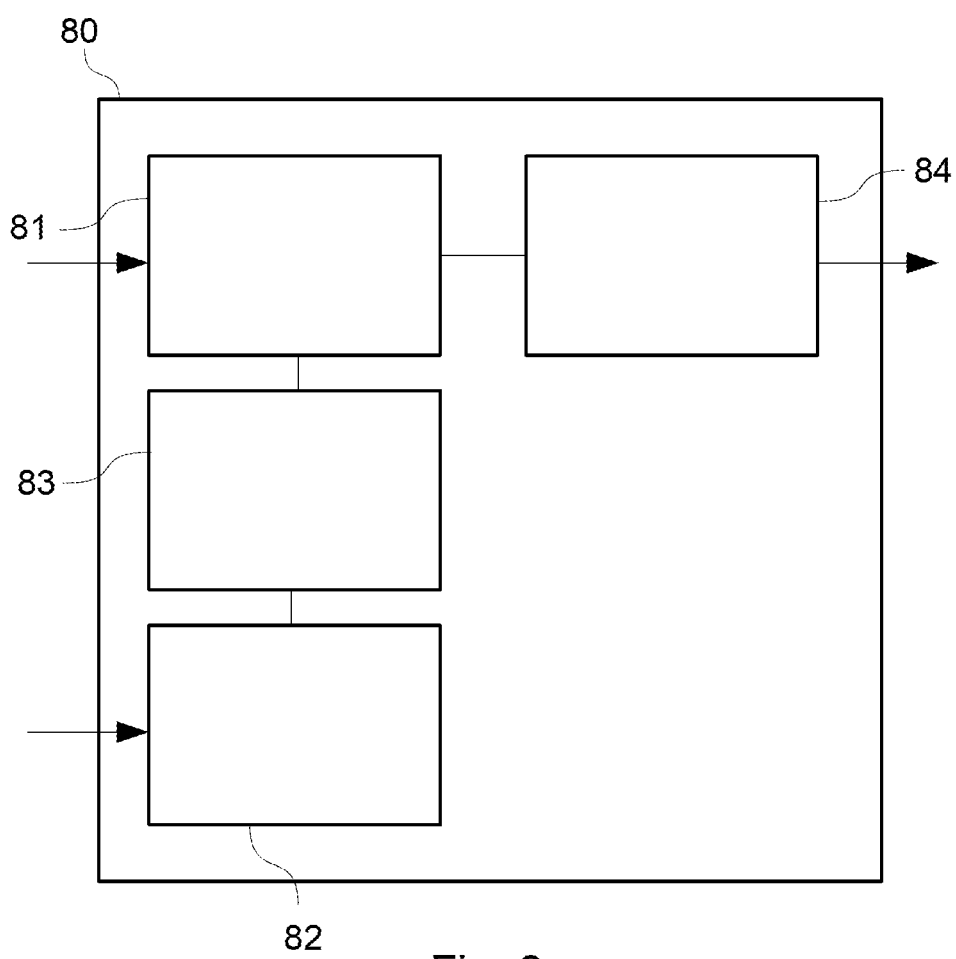
FIG. 8 is block diagram of an embodiment of a video encoding system.

With reference to FIG. 8, an encoding system according to an embodiment will now be described. An encoding system 80 is shown, which has an image receiver 81. The image receiver 81 is arranged to receive an image sequence comprising a first input image frame and a second input image frame, such as described above. The encoding system further comprises an overlay receiver 82 and an overlay applicator 83. The overlay receiver 82 is arranged to receive an overlay to be applied to the image sequence, the overlay comprising a picture element and spatial coordinates for positioning the picture element in the first and second input image frames. The overlay applicator 83 is arranged to add the picture element to the first and second input image frames in accordance with the spatial coordinates, thereby generating an overlaid image sequence comprising a first generated image frame and a second generated image frame. The video encoding system 80 also comprises an encoder 84, which is arranged to encode a video stream containing output image frames without overlay and corresponding output image frames with overlay. As described above, when encoding, the encoder is arranged to encode the first input image frame as an intraframe to form a first output image frame, encode the second input image frame as an inter-frame with reference to the first output image frame to form a second output image frame, encode the first generated image frame as an inter-frame with reference to the first output image frame to form a first overlaid output image frame, and to encode the second generated image frame as an inter-frame to form a second overlaid output image frame, wherein a first part of the second generated image frame is encoded with reference to the first overlaid output image frame, and a second part of the second generated image frame is encoded with reference to the second output image frame. The video encoding system 80 may be operated in accordance with the method described above, and the operation will therefore not be described further here.

Figure 9:
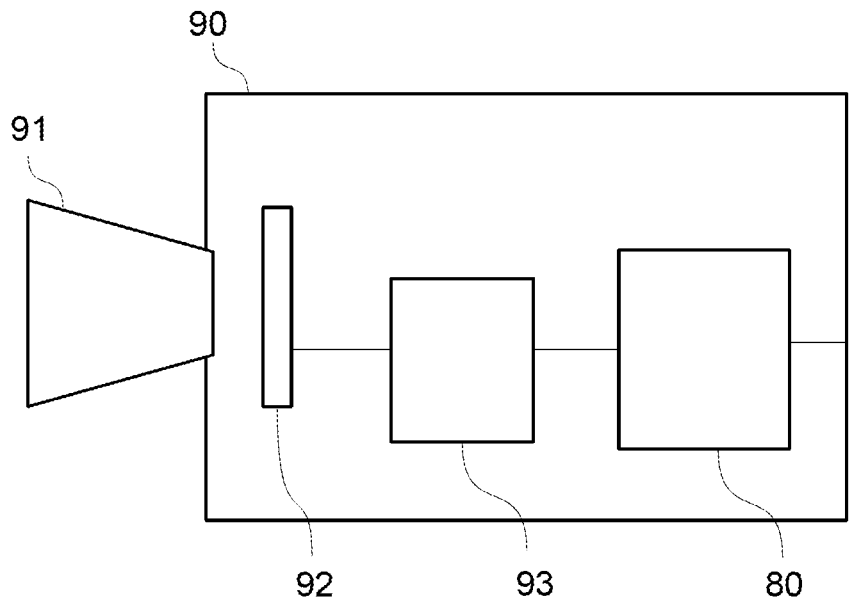
FIG. 9 is a block diagram of a camera having a video encoding system as in FIG. 5.

With reference to FIG. 9, the encoding system 80 may be integrated in a camera 90. The camera 90 has a lens 91, an image sensor 92 for capturing images, and an image processor 93 for processing the images. It should be appreciated that the camera 90 may comprise other components as well, but as they are not relevant to the present teachings, they are not shown in FIG. 9, and will not be discussed here. It should be noted that the video encoding system 80 does not have to be integrated in a camera, but could be arranged as a separate unit, or integrated in another device.

Figure 10:
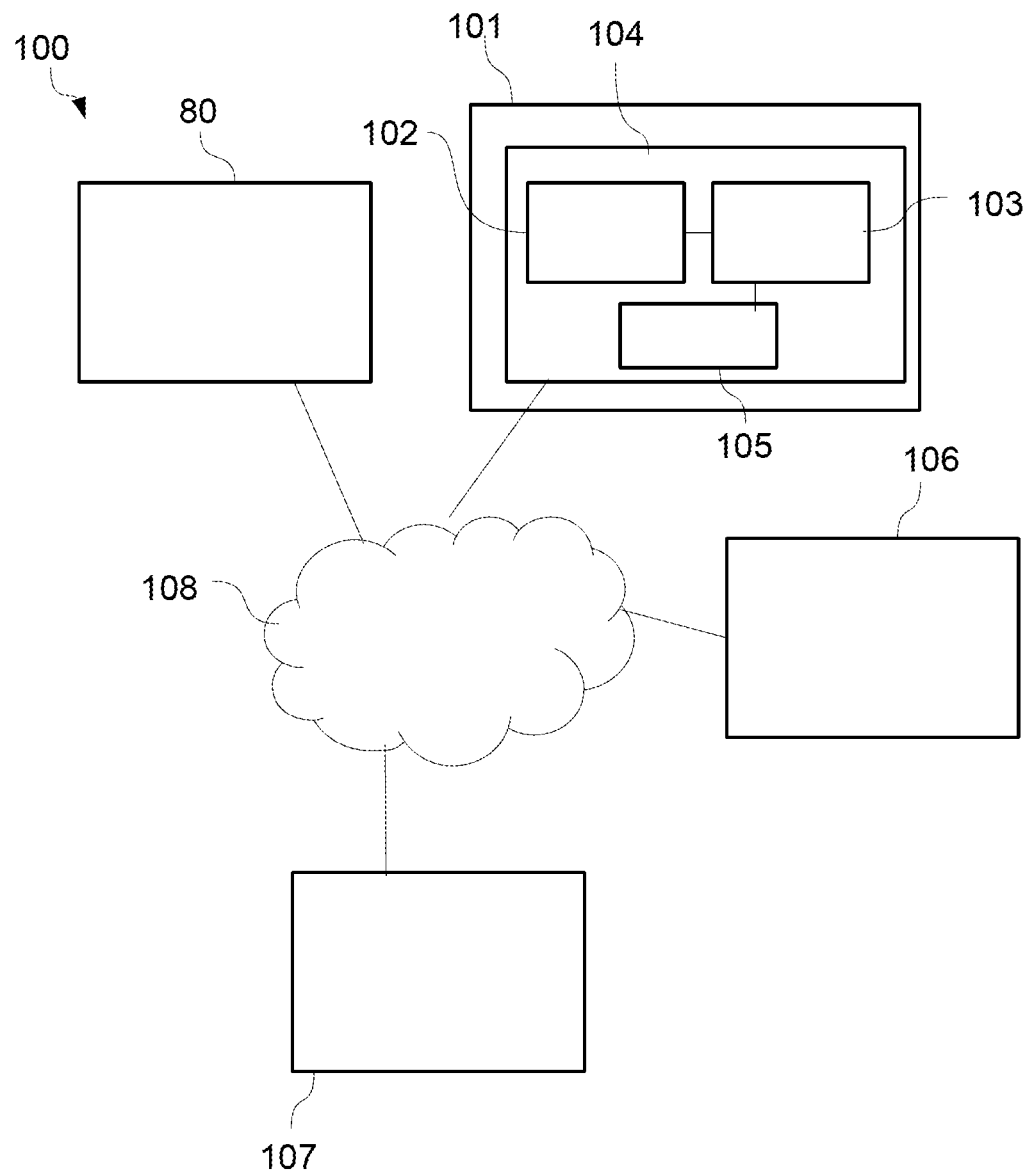
FIG. 10 is a block diagram of an embodiment of a video transmission system.

Turning to FIG. 10, a transmission system 100 according to an embodiment will be described. The video transmission system 100 comprises a video encoding system 80 as described above, and a decoding system 101. The decoding system 101 comprises a video receiver 102, which is arranged to receive the encoded video stream from the encoding system 80, and a decoder 103 arranged to decode the encoded video stream.

The decoded video sequence may be viewed or stored directly in the location of the decoder. Regardless of whether the encoding system 80 has encoded the output image frames with non-display flags, the decoder may be arranged to decode the output image frames with non-display flags.

The decoder 103 may be part of a transcoder 104, which is arranged to decode the first and second output image frames to form a first decoded video stream containing decoded image frames without overlay, and decode the first and second overlaid output image frames to form a second decoded video stream containing decoded image frames with overlay. The transcoder 104 may further comprise a re-encoder 105, which is arranged to encode each of the first and second decoded video streams separately, forming a first and second re-encoded video stream. For instance, the first re-encoded video stream may be stored in a storage device 106, and the second re-encoded video stream may be displayed on a display 107, e.g., in a control centre. The display 107 may be connected to a video management system. In FIG. 10, a network 108 is shown connecting the components of the video transmission system. This may be a local network or a wide area network. As an example, the encoding system 80 may be located in a first location, and the encoded video stream may be transmitted via the network 108 to the transcoder 104. The transcoder 104 may be located in a second location remote from the first location. The storage device 106 and the display 107 may be collocated with the transcoder 104, or located in a third location. Further, the storage device 106 and the display 107 may be located in different locations. Different users of the transmission system 100 may be given access to the first or the second decoded or re-encoded video stream depending on access rights they have been given. For instance, an operator in a security centre may have access only to the second decoded or re-encoded video stream, whereas a police officer may have access to the first decoded or re-encoded video stream.

It will be appreciated that a person skilled in the art can modify the above described embodiments in many ways and still use the advantages of the embodiments above. As an example, the input image frames may have been captured using any kind of camera, such as a camera employing visible light or IR, a thermal camera or a ToF camera. The camera may be a digital camera. The camera may be analogue camera connected to a digitalisation unit. The input images may be received directly from the camera or they may have been captured earlier and stored before they are encoded.

The output image frames and the overlaid output image frames may be numbered consecutively, such that the output image frames are given odd numbers, and the overlaid output image frames are given even numbers, or vice versa. The decoder may be instructed to display only the odd or even numbered frames in order to show either the output image frames or the overlaid output image frames.

The method may be implemented as software executed by a processor. The processor may be any kind of processor, e.g., a central processing unit (CPU), a graphics processing unit (GPU), a custom made processing device implemented in an integrated circuit, an ASIC, an FPGA, or logical circuitry including discrete components.

The encoding system and the transmission system may be implemented as hardware, firmware, or software, or any combination thereof.

Thus, the teachings should not be limited to the shown embodiments but should only be defined by the appended claims.

The invention claimed is:

1. A method of encoding video data performed in a camera, comprising:
   receiving an image sequence comprising a first not video encoded input image frame and a second not video encoded input image frame,
   receiving an overlay to be applied to the image sequence, the overlay comprising a picture element and spatial coordinates for positioning the picture element in the first and second input image frames,
   adding the picture element to the first and second input image frames in accordance with the spatial coordinates, thereby generating an overlaid image sequence comprising a first generated image frame and a second generated image frame,
   encoding a video stream containing output image frames without overlay and corresponding output image frames with overlay, wherein:
   the first input image frame is encoded as an intra-frame to form a first output image frame,
   the second input image frame is encoded as an inter-frame with reference to the first output image frame to form a second output image frame,
   the first generated image frame is encoded as an inter-frame with reference to the first output image frame to form a first overlaid output image frame,
   the second generated image frame is encoded as an inter-frame to form a second overlaid output image frame, wherein a first part of the second generated image frame is encoded with reference to the first overlaid output image frame, and a second part of the second generated image frame is encoded with reference to the second output image frame,
   whereby video data covered by the overlay in the overlaid output image frames is accessible in the output image frames without overlay.

2. The method according to claim 1, wherein the first output image frame and the second output image frame are each encoded with a non-display indicator.

3. The method according to claim 1, wherein the first part of the second generated frame contains at least a portion of the picture element.

4. The method according to claim 1, wherein the second part of the second generated frame is outside the spatial coordinates of the overlay.

5. The method according to claim 1, further comprising:
receiving an additional overlay to be applied to the image sequence, the additional overlay comprising an additional picture element and additional spatial coordinates for positioning the additional picture element in the first and second input image frames,
adding the additional picture element to the first and second input image frames in accordance with the additional spatial coordinates, thereby generating an additional overlaid image sequence comprising a first additional generated image frame and a second additional generated image frame,
wherein encoding a video stream containing output image frames without overlay and corresponding output image frames with overlay additionally comprises encoding corresponding output image frames with additional overlay, wherein:
the first additional generated image frame is encoded as an inter-frame with reference to the first output image frame to form a first additional overlaid output image frame,
the second additional generated image frame is encoded as an inter-frame to form a second additional overlaid output image frame, wherein a first part of the second additional generated image frame is encoded with reference to the first additional overlaid output image frame, and a second part of the second additional generated image frame is encoded with reference to the second output image frame.

6. The method according to claim 5, wherein the first part of the second additional generated frame contains at least a portion of the additional picture element.

7. The method according to claim 1, wherein the second part of the second additional generated frame is outside the additional spatial coordinates of the additional overlay.

8. A video camera comprising a video encoding system, the video encoding system comprising:
an image receiver arranged to receive an image sequence comprising a first not video encoded input image frame and a second not video encoded input image frame,
an overlay receiver arranged to receive an overlay to be applied to the image sequence, the overlay comprising a picture element and spatial coordinates for positioning the picture element in the first and second input image frames,
an overlay applicator arranged to add the picture element to the first and second input image frames in accordance with the spatial coordinates, thereby generating an overlaid image sequence comprising a first generated image frame and a second generated image frame,
an encoder arranged to encode a video stream containing output image frames without overlay and corresponding output image frames with overlay, wherein:
the first input image frame is encoded as an intra-frame to form a first output image frame,
the second input image frame is encoded as an inter-frame with reference to the first output image frame to form a second output image frame,
the first generated image frame is encoded as an inter-frame with reference to the first output image frame to form a first overlaid output image frame, the second generated image frame is encoded as an inter-frame to form a second overlaid output image frame, wherein a first part of the second generated image frame is encoded with reference to the first overlaid output image frame, and a second part of the second generated image frame is encoded with reference to the second output image frame,
whereby video data covered by the overlay in the overlaid output image frames is accessible in the output image frames without overlay.

9. The video camera according to claim 8, wherein the encoder is arranged to encode both of the first output image frame and the first overlaid output image frame with a first picture order count, and to encode both of the second output image frame and the second overlaid output image frame with a second picture order count.

10. The video camera according to claim 8, wherein the encoder is arranged to encode each of the first output image frame and the second output image frame with a non-display indicator.

11. The video camera according to claim 8, wherein
the overlay receiver is additionally arranged to receive an additional overlay to be applied to the image sequence, the additional overlay comprising an additional picture element and additional spatial coordinates for positioning the additional picture element in the first and second input image frames,
the overlay applicator is additionally arranged to add the additional picture element to the first and second input image frames in accordance with the additional spatial coordinates, thereby generating an additional overlaid image sequence comprising a first additional generated image frame and a second additional generated image frame,
and the encoder is arranged to encode the video stream additionally containing corresponding output image frames with additional overlay, wherein:
the first additional generated image frame is encoded as an inter-frame with reference to the first output image frame to form a first additional overlaid output image frame,
the second additional generated image frame is encoded as an inter-frame to form a second additional overlaid output image frame, wherein a first part of the second additional generated image frame is encoded with reference to the first additional overlaid output image frame, and a second part of the second additional generated image frame is encoded with reference to the second output image frame.

12. A video transmission system comprising an encoding system according to claim 8 and a decoding system, the decoding system comprising:
a video receiver arranged to receive the encoded video stream from the encoding system, and
a decoder arranged to decode the encoded video stream.

13. The video transmission system according to claim 12, wherein the decoder is arranged to decode the first and second output images with a non-display indicator.

14. The video transmission system according to claim 12, further comprising a transcoder, the transcoder comprising the decoder, wherein the transcoder is arranged to
decode the first and second output image frames to form a first decoded video stream containing decoded image frames without overlay, and decode the first and second overlaid output image frames to form a second decoded video stream containing decoded image frames with overlay.

15. A camera including an encoding system comprising:
an image receiver arranged to receive an image sequence comprising a first not video encoded input image frame and a second not video encoded input image frame,
an overlay receiver arranged to receive an overlay to be applied to the image sequence, the overlay comprising a picture element and spatial coordinates for positioning the picture element in the first and second input image frames,
an overlay applicator arranged to add the picture element to the first and second input image frames in accordance with the spatial coordinates, thereby generating an overlaid image sequence comprising a first generated image frame and a second generated image frame,
an encoder arranged to encode a video stream containing output image frames without overlay and corresponding output image frames with overlay, wherein:
the first input image frame is encoded as an intra-frame to form a first output image frame,
the second input image frame is encoded as an inter-frame with reference to the first output image frame to form a second output image frame,
the first generated image frame is encoded as an inter-frame with reference to the first output image frame to form a first overlaid output image frame, the second generated image frame is encoded as an inter-frame to form a second overlaid output image frame, wherein a first part of the second generated image frame is encoded with reference to the first overlaid output image frame, and a second part of the second generated image frame is encoded with reference to the second output image frame,
whereby video data covered by the overlay in the overlaid output image frames is accessible in the output image frames without overlay.

* * * * *